United States Patent
Mehta et al.

(10) Patent No.: US 7,051,517 B2
(45) Date of Patent: May 30, 2006

(54) APPARATUS AND METHOD FOR ELECTRONIC THROTTLE CONTROL POWER MANAGEMENT ENHANCEMENTS

(75) Inventors: Vivek Mehta, Bloomfield Hills, MI (US); Joseph M. Stempnik, Warren, MI (US); Donovan L. Dibble, Utica, MI (US); Paul A. Bauerle, Fenton, MI (US)

(73) Assignee: General Motors Corporation, Detroit, MI (US)

( * ) Notice: Subject to any disclaimer, the term of this patent is extended or adjusted under 35 U.S.C. 154(b) by 166 days.

(21) Appl. No.: 10/626,003

(22) Filed: Jul. 24, 2003

(65) Prior Publication Data

US 2005/0016162 A1    Jan. 27, 2005

(51) Int. Cl.
*F01N 3/00* (2006.01)

(52) U.S. Cl. .......................... 60/285; 60/274; 60/277; 60/284

(58) Field of Classification Search ................ 60/274, 60/277, 285, 284
See application file for complete search history.

(56) References Cited

U.S. PATENT DOCUMENTS

| | | | | |
|---|---|---|---|---|
| 5,483,941 A | * | 1/1996 | Cullen et al. | 123/481 |
| 5,678,402 A | * | 10/1997 | Kitagawa et al. | 60/276 |
| 5,956,941 A | * | 9/1999 | Cullen et al. | 60/274 |
| 6,560,960 B1 | * | 5/2003 | Nishimura et al. | 60/284 |
| 6,622,479 B1 | * | 9/2003 | Kakuyama et al. | 60/285 |
| 6,725,649 B1 | * | 4/2004 | Yamashita et al. | 60/284 |

* cited by examiner

*Primary Examiner*—Binh Q. Tran
(74) *Attorney, Agent, or Firm*—Christopher DeVries

(57) ABSTRACT

A controller estimates a temperature of a catalytic converter in a vehicle and determines an engine speed. The controller shuts off fuel to the engine if the estimated temperature is greater than a maximum temperature of the catalytic converter and the engine speed is greater than a maximum engine speed. If the estimated catalytic converter temperature is greater than the maximum temperature, the controller delays a spark retard request to the engine. The controller updates vehicle torque with an integral torque if an RPM error is within an RPM error range and vehicle speed is less than a maximum vehicle speed for a first period. The controller increases torque to the engine by a proportional torque if an RPM error is within an RPM error range to prevent engine stall. The controller updates the integral torque when the RPM error is within an RPM error range for a first period.

4 Claims, 5 Drawing Sheets

APPARATUS AND METHOD FOR ELECTRONIC THROTTLE CONTROL POWER MANAGEMENT ENHANCEMENTS

FIELD OF THE INVENTION

The present invention relates to electronic throttle control, and more particularly to electronic throttle control for power management.

BACKGROUND OF THE INVENTION

Electronic Throttle Control (ETC) power management is utilized to remedy certain conditions that may arise during a vehicle operation, such as an increased probability of an engine stall, RPM errors, and transitions between torque control modes. A vehicle controller identifies whether the conditions exist by requesting changes to engine torque. Engine torque can be increased or decreased depending on the condition identified by the vehicle controller. Traditionally, ETC power management has utilized two methods for generating a requested torque engine signal: idle speed torque control and accelerator pedal torque control. The vehicle controller achieves the requested engine torque by retarding spark or disabling fuel to one or more cylinders.

Idle speed torque control utilizes classical Proportional/Integral terms to calculate a requested engine torque that is required to maintain the desired engine speed. This control method is available at lower vehicle speeds with no accelerator pedal input. Desired engine speed is determined by a separate function based on engine load, ambient temperature, coolant temperature, engine run time, and other factors.

Accelerator pedal torque control is typically active when idle speed torque control is not available. A desired torque is calculated based on a current accelerator pedal position and engine speed. Changes in requested engine torque are rate-limited to prevent excessive variation.

Under certain engine conditions, torque control may adversely impact engine components and/or performance. The vehicle controller closely monitors engine conditions prior to and during ETC power management to avoid the adverse impact. For example, increasing torque at high engine speeds and temperatures may reduce the efficiency of the catalytic converter. One method of protecting the catalytic converter from excessive temperatures involves using a catalyst material with a higher temperature tolerance. These catalyst materials typically reduce the efficiency of the catalytic converter at lower temperatures, and are often more expensive.

Another problem involves engine stall during accelerator pedal torque control. Engine load conditions may vary during accelerator pedal torque control, which causes a disparity between desired torque and actual torque. One method for preventing engine stalls during heavy load conditions uses a stall prevention algorithm to increase engine torque. The algorithm allocates the full amount of torque available at the respective speed to prevent engine stall. Full allocation of torque at low speeds is inefficient and leads to reduced fuel economy and engine life.

SUMMARY OF THE INVENTION

A controller regulates a temperature of a catalytic converter in a vehicle. The controller estimates the temperature of the catalytic converter and determines an actual engine speed. The controller shuts off fuel to the engine if the estimated temperature of the catalytic converter is greater than a maximum temperature of the catalytic converter and the actual engine speed is greater than a maximum engine speed. Additionally, the controller delays a spark retard request to an engine if the estimated temperature of the catalytic is greater than the maximum temperature of the catalytic converter.

In another embodiment, the controller improves torque control in an engine. The controller determines an RPM error, a vehicle speed, and an integral torque. The controller updates vehicle torque with the integral torque if the RPM error is within an RPM error range and the vehicle speed is less than a maximum vehicle speed for a first period.

In yet another embodiment, the controller increases torque to prevent engine stall in a vehicle. The controller determines RPM error and a proportional torque based on the RPM error and increases torque to the engine by the proportional torque if the RPM error is within an RPM error range.

In still another embodiment, the controller updates an integral torque term of a torque controller in an engine. The controller determines RPM error and updates the integral torque term if the RPM error is within an RPM error range for a first period.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
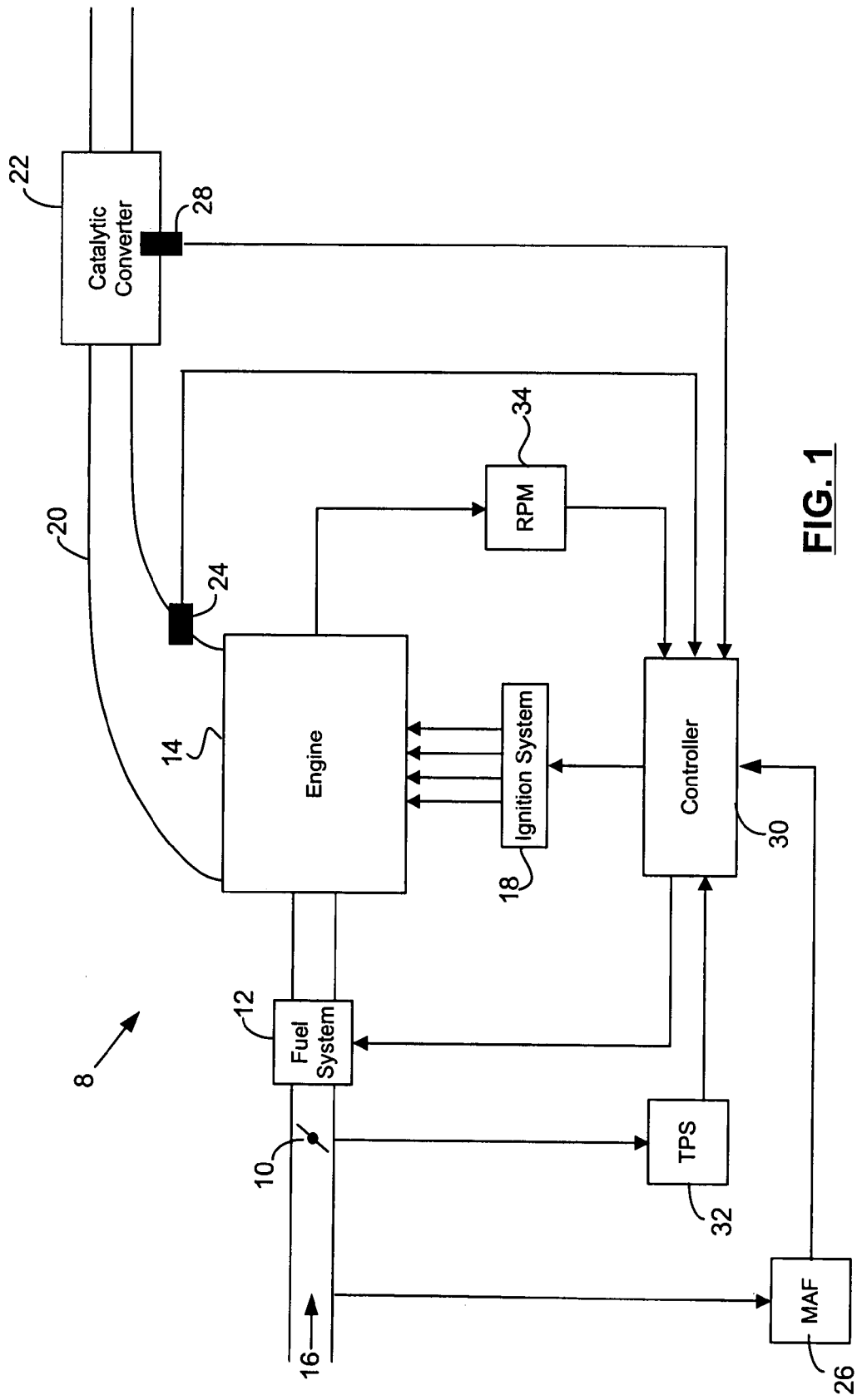
FIG. 1 is a block diagram of an engine control system.

Referring to FIG. 1, an exemplary engine control system 8 is shown. The throttle 10 and fuel system 12 determine the air and fuel delivered to the engine 14 through the intake 16. The ignition system 18 ignites the air/fuel mixture in the engine 14. Exhaust gas created by the ignition of the air/fuel mixture is expelled through the exhaust manifold 20. The catalytic converter 22 receives the exhaust gas and reduces the emissions levels of the exhaust gas.

The controller 30 communicates with various components of the engine control system 8, including but not limited to the throttle position sensor 32 (TPS), the fuel system 12, the ignition system 18, and the engine speed sensor 34 (RPM). The controller 30 receives a throttle position signal from the TPS 32 and uses the information to determine air flow into the engine 14. The air flow data is then used to calculate fuel delivery from the fuel system 12 to the engine 14. The controller 30 further communicates with the ignition system 18 to determine ignition spark timing.

The controller 30 may receive additional feedback from other components in the engine control system 8, including engine coolant temperature, mass air flow rate, and engine speed. These and other variables may affect the overall performance and behavior of the engine control system 8. The controller 30 is responsible for implementing Electronic Throttle Control (ETC) power management. Under certain engine conditions, the controller 30 enters ETC power management to remedy irregular or inefficient performance issues. While in ETC power management mode, the controller 30 utilizes data gathered from the various engine components to monitor and, in some cases, correct engine performance.

Still referring to FIG. 1, the controller 30 estimates the temperature of the catalytic converter 22. The controller 30 estimates the temperature of the catalytic converter 22 using data such as coolant temperature, exhaust temperature, and air flow. Exhaust temperature is acquired using an exhaust gas temperature (EGT) sensor 24. A mass air flow (MAF) sensor 26 measures air flow. In one embodiment, a software model associated with the controller 30 uses data obtained from engine control components to estimate catalytic converter 22 temperature. In an alternative embodiment, a direct measurement of catalytic converter 22 temperature is taken using thermocouples 28.

During ETC power management, it may be necessary to alter the timing of the spark delivered by the ignition system 18 to decrease engine torque. This may be implemented by retarding spark using the ignition system. However, it is possible that decreasing engine torque may have a detrimental effect on the catalytic converter 22 at high engine speeds. This is especially true if the catalytic converter 22 is already at an extremely high temperature.

Figure 2:
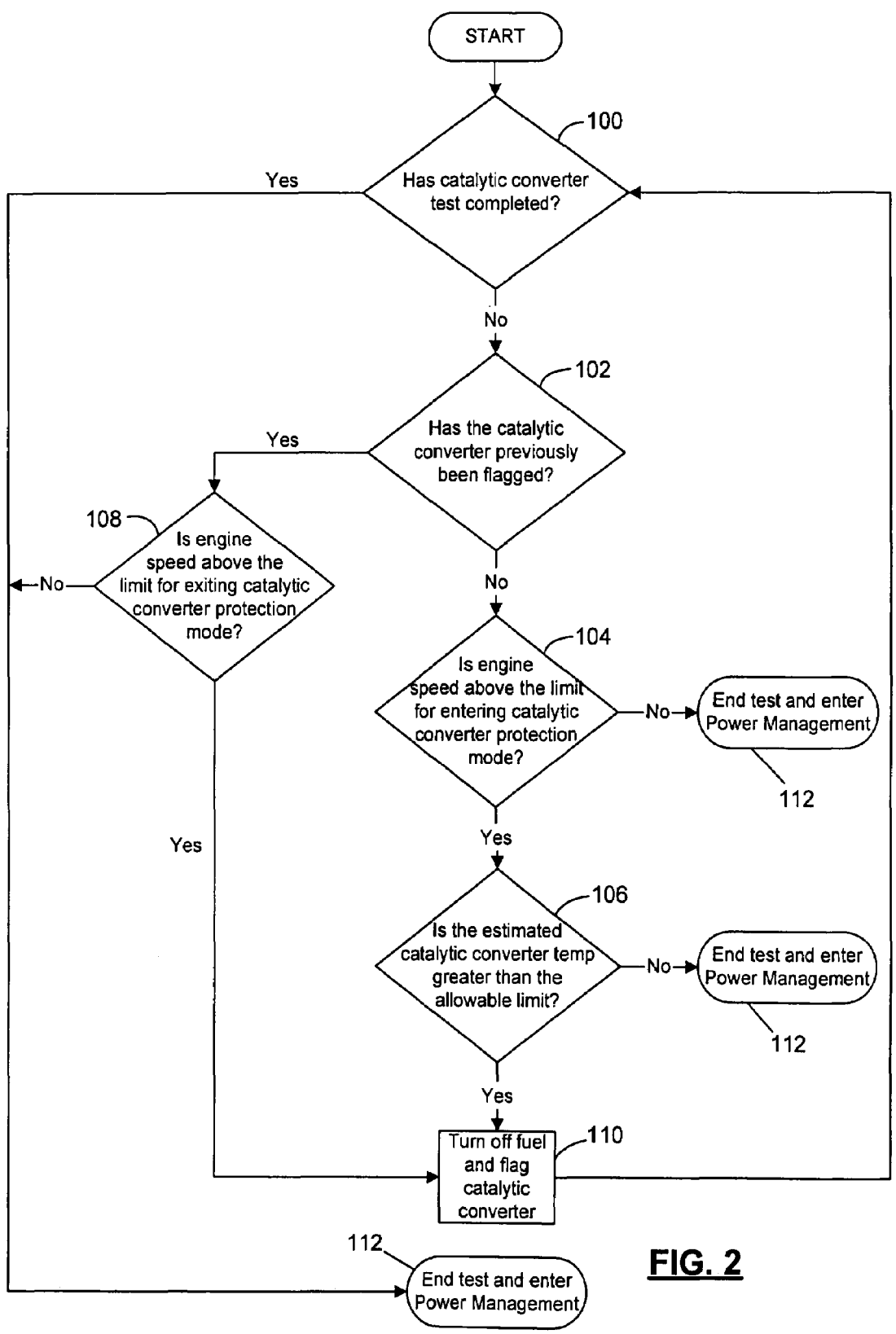
FIG. 2 is a flow diagram illustrating steps of a method for protecting a catalytic converter according to the present invention.

Referring now to FIG. 2, a method for protecting the catalytic converter 22 from excessive temperature is shown. Prior to the execution of spark timing commands, the controller 30 performs a catalytic converter temperature test and then enters a power management mode. In step 100, control determines whether the catalytic converter temperature test has completed. If the test has completed, the controller 30 indicates that the test has completed and subsequently enters power management mode in step 112. If the test has not completed, the controller 30 performs the necessary steps to protect the catalytic converter 22.

In step 102, the controller 30 determines if the catalytic converter 22 was previously flagged as having a high temperature condition, causing the controller 30 to enter a catalytic converter protection mode. If the catalytic converter 22 was previously flagged, the controller 30 determines if the engine speed is too high to exit the protection mode in step 108. If the controller 30 is in catalytic converter protection mode and the engine speed is still above a minimum predetermined threshold, the controller 30 shuts off fuel to the engine and returns to step 100. This sequence will be repeated until the engine speed drops below the predetermined threshold for exiting catalytic converter protection mode. When the engine speed decreases sufficiently, the test ends and the controller 30 enters power management mode in step 112.

If the controller 30 is not already in catalytic converter protection mode, the controller 30 determines whether the engine speed is above a maximum speed threshold in step 104. The maximum and minimum speed thresholds form a hysteresis pair for engine speed. If the engine speed is above the maximum speed threshold, the controller performs step 106. Otherwise, the test ends and the controller 30 enters power management mode in step 112. In step 106, the controller 30 determines if the estimated catalytic converter temperature is above a temperature limit. If the engine speed is above the maximum speed threshold and the catalytic converter temperature is above the temperature limit, the controller 30 enters catalytic converter protection mode and shuts off fuel to the engine at 110. The test is repeated in step 100 until engine speed returns below the minimum threshold.

When the catalytic converter 22 is at a high temperature, the controller 30 delays spark retard. When the controller 30 begins the transition to power management mode due to a spark retard request, the controller 30 determines if the catalytic converter 22 is at a high temperature. If necessary, the controller 30 delays spark retard for a calculated number of engine cylinder events before applying the requested spark retard.

Figure 3:
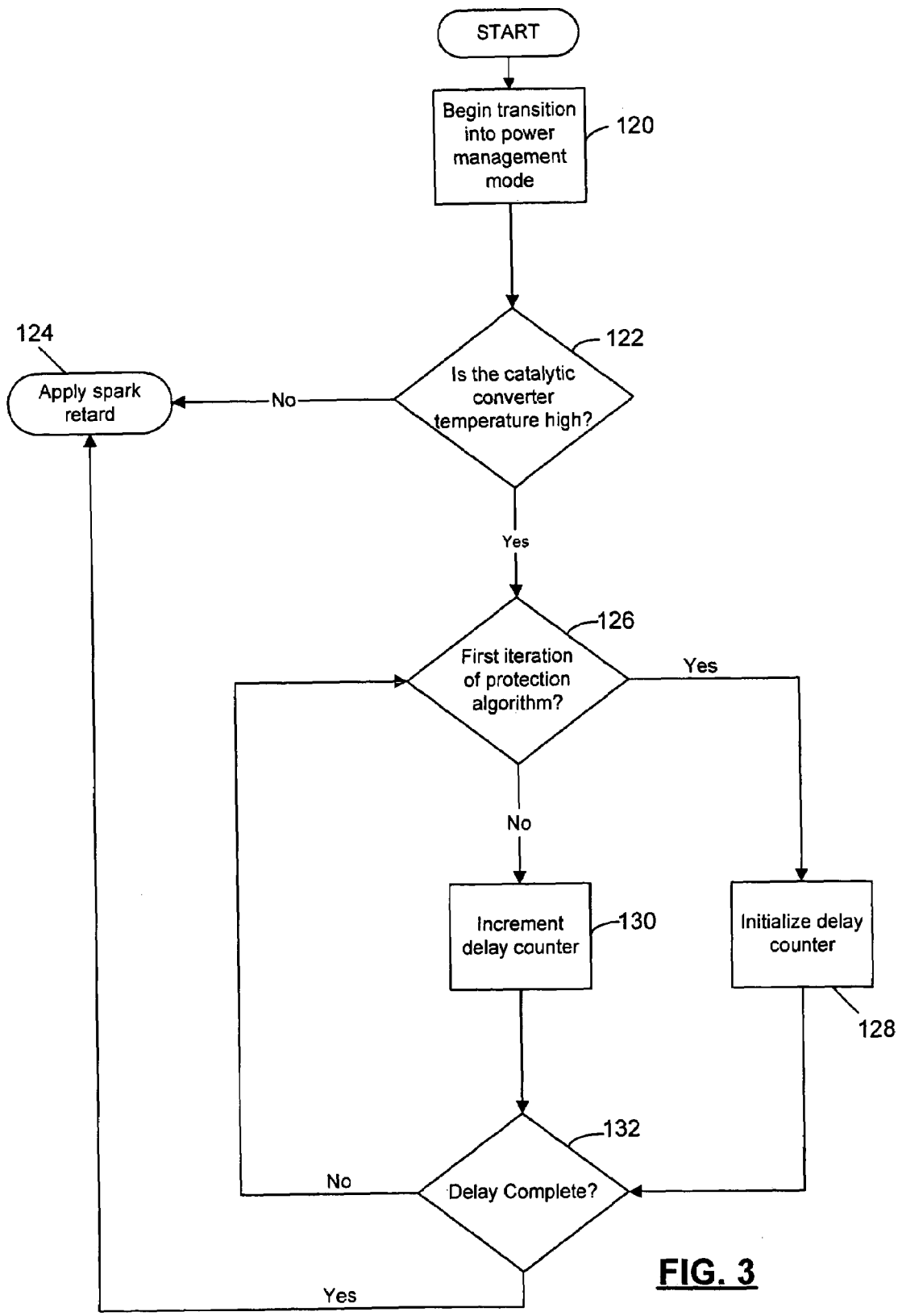
FIG. 3 is a flow diagram illustrating steps of a method for delaying a spark retard request according to the present invention.

Referring now to FIG. 3, the controller 30 begins a transition to power management mode upon receipt of a spark retard request at 120. If the controller 30 determines that the catalytic converter temperature is not high in step 122, spark retard is applied in step 124. Otherwise, the controller 30 implements a delay algorithm in step 126. If the delay algorithm is in its first iteration, a delay counter is initialized in step 128. If the delay algorithm is in a later iteration, the delay counter is incremented in step 130. The controller 30 compares the value of the delay counter to a predetermined delay value in step 132 to determine if the delay is sufficient to protect the catalytic converter 22. If the delay is complete, the controller 30 applies the spark retard. If the controller 30 determines a further delay is necessary, the delay algorithm continues with step 126. The predetermined delay value can be calibrated or varied according to various conditions in the electronic engine control system.

The electronic engine control system effectuates a transition between idle speed torque control and accelerator pedal torque control during ETC power management. Because idle speed torque and accelerator pedal torque are controlled using different control schemes, the transition between the two may be inefficient. A smoother transition can be achieved by learning the required integral offset during idle speed torque control. The integral offset is an adjustment to torque to maintain a desired engine speed. Adding the integral offset to the torque value determined for accelerator pedal torque control compensates for the differences in torque requested by the two control schemes.

Figure 4:
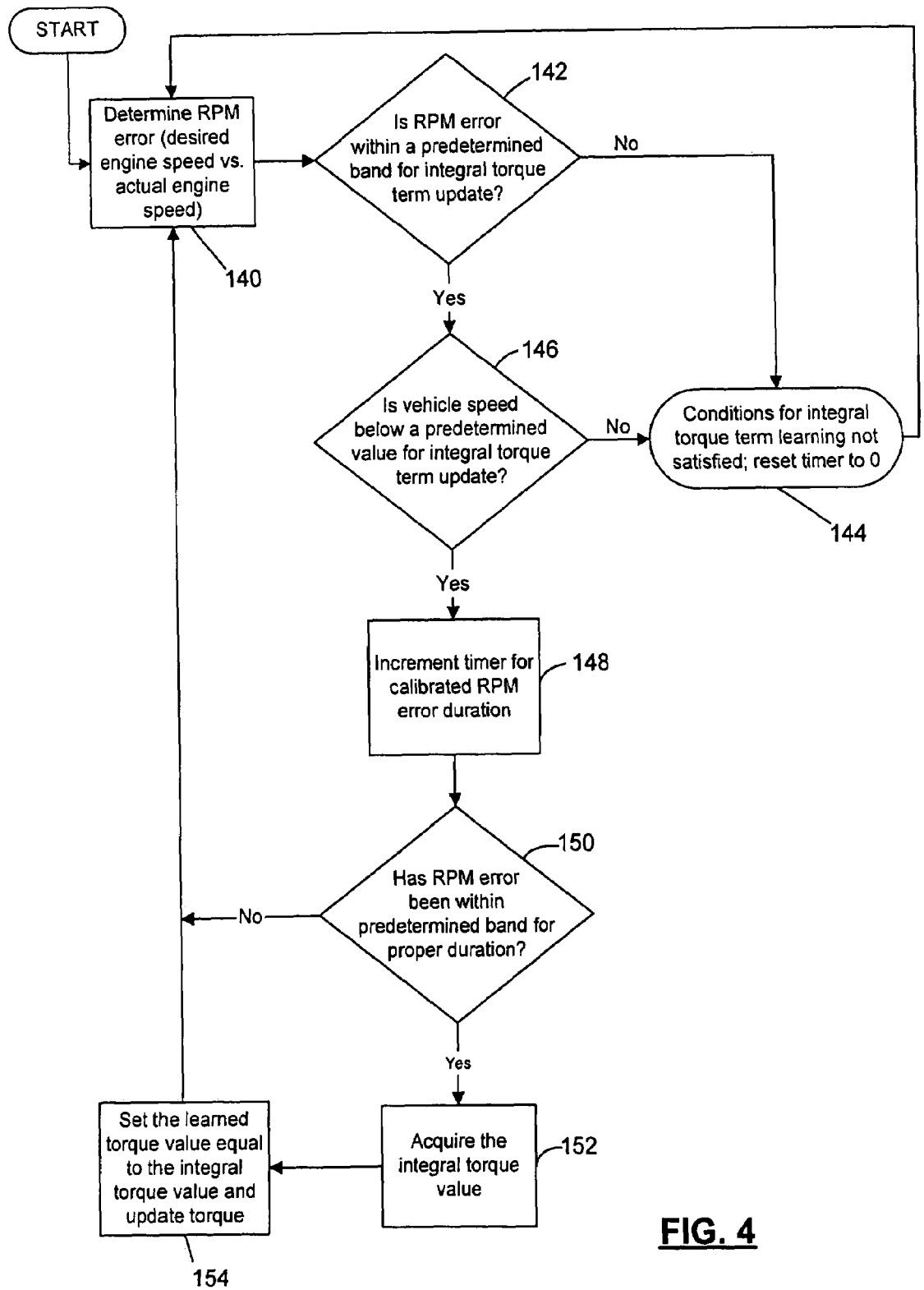
FIG. 4 is a flow diagram illustrating steps of a method for improving the transition between idle speed torque control and accelerator pedal torque control.

Referring to FIG. 4, a method for adjusting the transition between idle speed torque control and accelerator pedal torque control is shown. This is accomplished by an integral offset learning algorithm. The controller 30 receives an estimated engine speed from the engine speed sensor 34. The estimated engine speed is compared to the desired engine speed to determine an RPM error at 140. In step 142, control determines whether the RPM error determined in step 140 is within a predetermined error range. If the RPM error is not within the error range, the controller 30 resets the process in step 144.

If the RPM error is within the error band, the controller 30 compares actual vehicle speed to a predetermined speed value in step 146. When the vehicle is above the predetermined speed value, conditions for learning the integral offset are not satisfied and the controller 30 resets the process in step 144. If the vehicle is below the predetermined speed, the controller 30 increments an integral torque learn timer at 148. The integral torque learn timer represents the duration that the RPM error has remained within the error range. When the RPM error remains within the error band for a preset duration the integral offset learning process continues. Step 150 determines if the RPM error has been within the error range for the proper duration. If not, the process continues until the duration condition is met. When the RPM error is within the error range for the proper duration, the controller 30 acquires the integral torque offset in step 152. The controller 30 updates the engine torque in step 154 using the torque offset.

Another function of torque control during ETC power management according to the present invention is the prevention of engine stall under heavy load conditions. When engine torque is actively controlled by disabling fuel to one or more engine cylinders, the probability that an engine stall will occur is significantly increased. Under accelerator pedal torque control, a proportional torque term increases the requested engine torque to a value sufficient to prevent an engine stall. The controller 30 calculates the increase in engine torque based on the proportional gain and the difference between actual engine speed and the desired idle speed. The proportional torque term is active when the actual engine speed falls below the desired idle speed.

Figure 5:
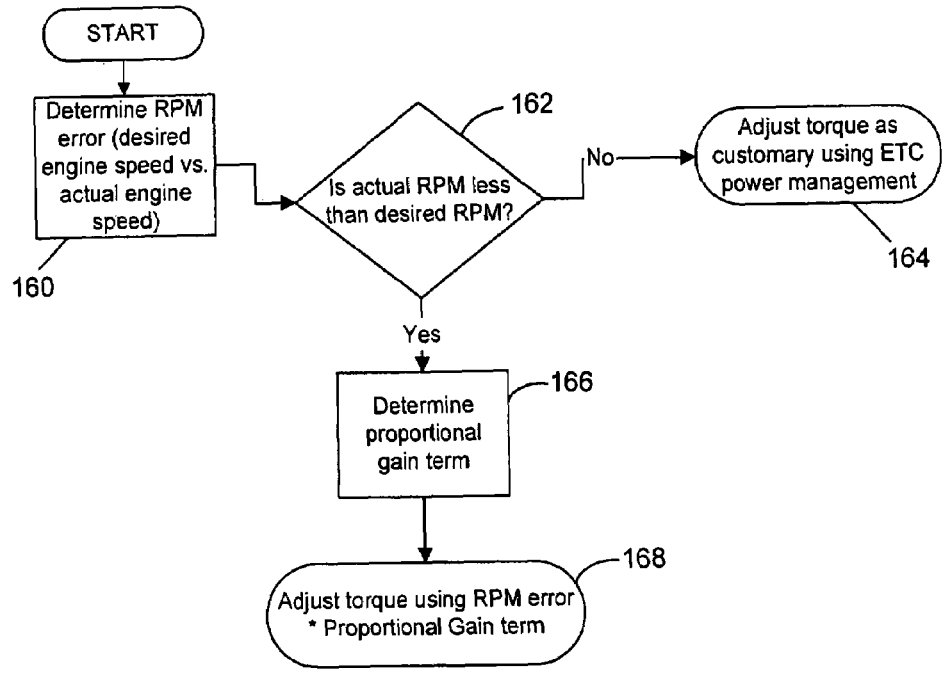
FIG. 5 is a flow diagram illustrating steps of a method for managing torque to prevent engine stall.

Referring to FIG. 5, a method for increasing torque to prevent engine stall under ETC power management is shown. The controller 30 estimates the RPM error in step 160 and determines whether the actual engine speed is less than the desired engine speed in step 162. If the actual engine speed is satisfactory, the controller 30 adjusts engine torque using customary ETC power management techniques. Otherwise, the controller 30 determines the proportional gain term in step 166 and adjusts torque based on a calculation using the RPM error and the proportional gain term in step 168. The controller 30 multiplies the proportional gain term by RPM error and uses this calculated value to update the torque.

During certain engine conditions under ETC power management, it may become necessary to delay the update of the integral term used for idle speed torque control. This is especially true at low engine speeds when select engine cylinders may not be contributing to controllable torque. Under these conditions, it is more efficient for the controller 30 to delay the update of the integral term.

Figure 6:
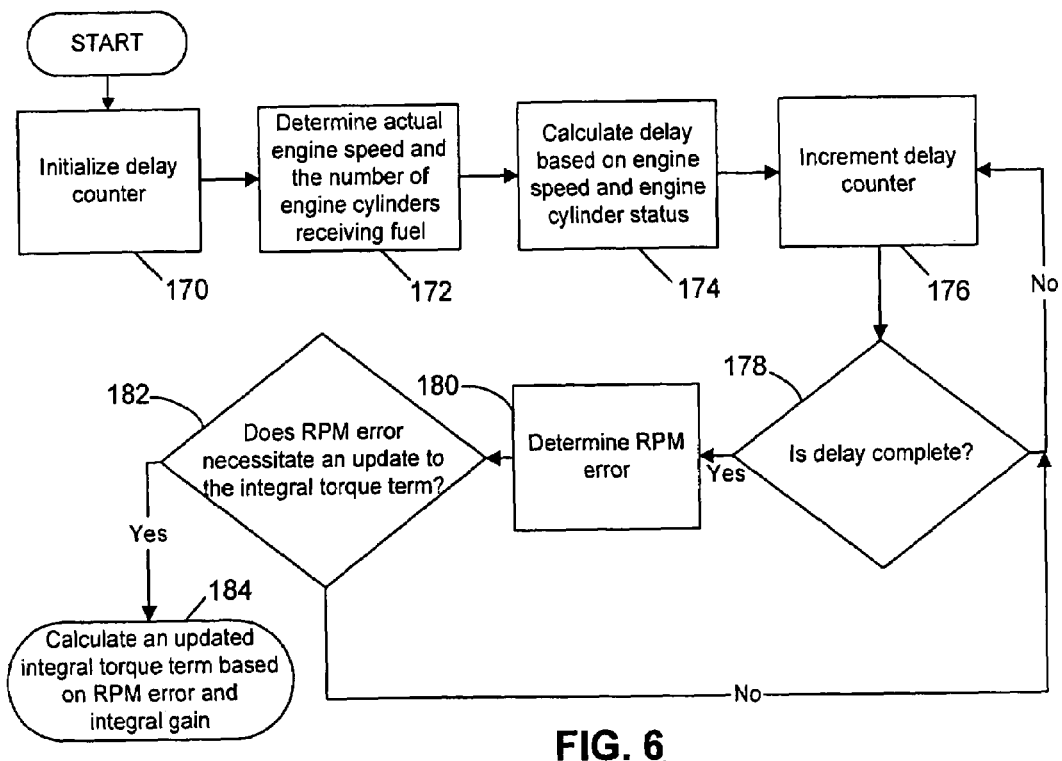
FIG. 6 is a flow diagram illustrating steps of a method for delaying an idle integral torque term update.

Referring now to FIG. 6, a method for delaying the integral term update is shown. A delay counter is initialized in step 170. The controller 30 determines the status of relevant engine conditions in step 172, including actual engine speed and the number of engine cylinders receiving fuel. Only the engine cylinders receiving fuel contribute to the controllable torque of the engine. A suitable delay is calculated in step 174 using the engine conditions determined in step 172. The controller 30 determines if the delay has completed in step 178 by comparing the delay counter to the desired delay. The controller 30 continues to increment the delay counter in step 176 until the calculated delay is achieved. The controller 30 determines RPM error in step 180 and calculates whether the RPM error satisfies a specific value required for an integral torque term update in step 182. The integral torque term is updated in step 184 using RPM error and integral gain. The controller 30 multiplies the RPM error by the integral gain and adds the value to the current integral torque term to calculate the updated value.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A method for regulating a temperature of a catalytic converter in a vehicle including an engine, comprising:
   defining a maximum temperature for the catalytic converter;
   defining a maximum engine speed threshold;
   estimating the temperature of the catalytic converter;
   determining actual engine speed; and
   shutting off fuel to the engine if the estimated temperature of the catalytic converter is greater than the maximum temperature of the catalytic converter and the actual engine speed is greater than the maximum engine speed threshold.

2. The method of claim 1 further comprising:
   defining a minimum engine speed threshold; and
   turning on fuel to the engine if the actual engine speed is less than the minimum engine speed threshold.

3. A temperature regulator for a catalytic converter on a vehicle including an engine, comprising:
   a temperature estimator that at least one of measures and estimates catalytic converter temperature;
   a speed sensor that senses engine speed;
   a fuel system that supplies fuel to the engine; and
   a controller that communicates with the temperature estimator, the speed sensor, and the fuel system and that shuts off fuel to the engine when the catalytic converter temperature is greater than a maximum temperature and the engine speed is greater than a maximum engine speed.

4. The temperature regulator of claim 3 wherein the controller continues to shut off fuel to the engine when the engine speed sensor returns an engine speed that is greater than a minimum engine speed.

* * * * *